June 17, 1930.                M. LOUGHEAD                1,764,176
                              HYDRAULIC BRAKE
                         Filed May 31, 1923        2 Sheets-Sheet 1

June 17, 1930.  M. LOUGHEAD  1,764,176
HYDRAULIC BRAKE
Filed May 31, 1923  2 Sheets-Sheet 2
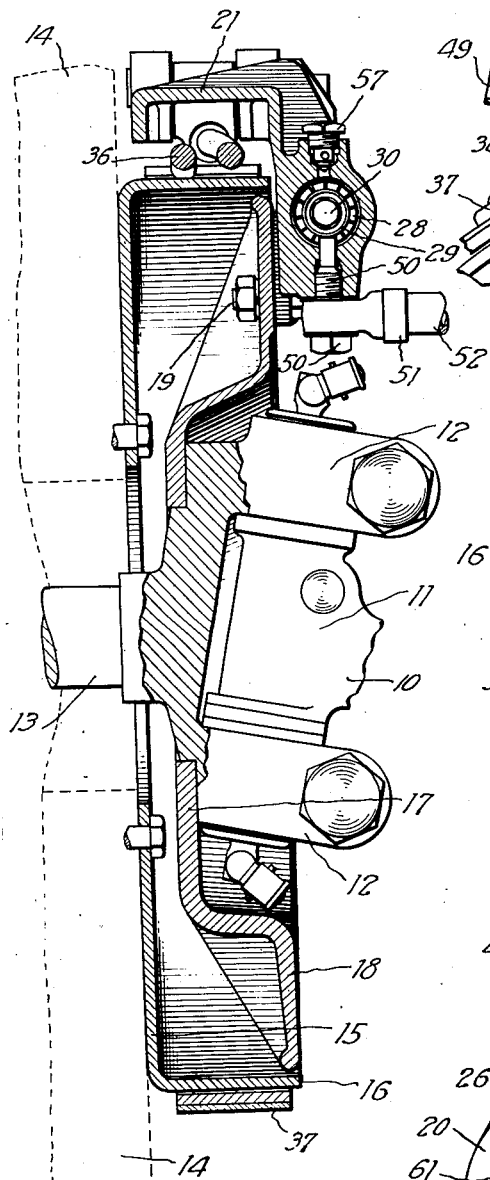
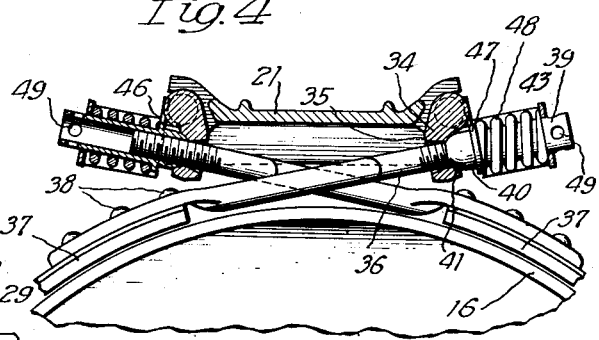
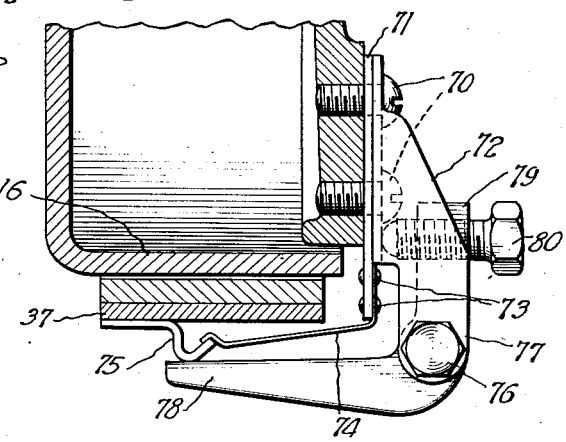
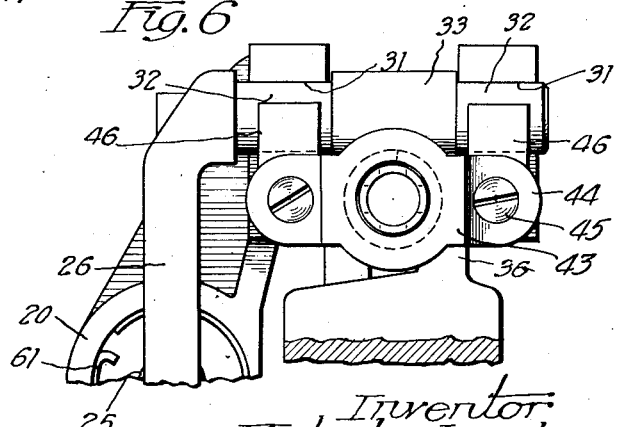
Inventor:
Malcolm Loughead
Williams Bradbury
McCabe & Prince Attys.

Patented June 17, 1930

1,764,176

UNITED STATES PATENT OFFICE

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA

HYDRAULIC BRAKE

Application filed May 31, 1923. Serial No. 642,390.

This invention relates to hydraulic brakes for vehicles, such as automobiles, and particularly to brakes of this character which are adapted to be applied to all four wheels of the vehicle.

The object of the invention is the provision of fluid actuated brake operating mechanism which will consist of few parts, be light in weight, cheap to manufacture, reliable and efficient in operation, and the parts of which will, to a large extent, be interchangeable.

One of the features of the invention is the provision of a brake operating cylinder and associated parts which may be interchangeably used on any of the four wheels of the vehicle.

Another feature of the invention is the arrangement which permits the mounting of the cylinder and connected parts on the closure plate for the brake drum, thus permitting the device to be applied, without change, to the rear wheels of many existing types of automobiles.

Other features and advantages will appear from a detailed description of the invention.

Referring now to the drawings,

Figure 1 is a side view looking at the inside of a brake drum, and also the brake operating mechanism associated therewith, the brake operating cylinder being in vertical section;

Figure 2 is a plan view of the device as shown in Figure 1;

Figure 3 is a section on line 3—3 of Figure 1;

Figure 4 is a section substantially on line 4—4 of Figure 2;

Figure 5 is a section on line 5—5 of Figure 1, and

Figure 6 is a view of the upper portion of the brake operating mechanism as viewed from the right in Figure 1.

In the drawings, in which like reference characters indicate like parts in the several views, 10 indicates one end of the front axle of an automobile which terminates in the stationary member 11 of the steering knuckle. Secured to the part 11 by the usual steering knuckle pivot pin are the parts 12 which are carried by the front wheel swivel axle 13. At 14 are indicated spokes of the front wheel to which are secured, in any desired manner, the brake drum consisting of the vertically extending portion 15 provided with the marginal annular flange 16.

To the swinging portion of the steering knuckle is rigidly secured, in any desired manner, the brake drum closure plate 17. The central portion of the closure plate 17 may, if necessary, be arranged in close proximity to the vertical flange 15 of the brake drum. The closure plate, however, flares outwardly toward the axle 10 and its outer margin terminates in a flange 18, the outer surface of which lies substantially in the plane of the edge of the brake drum 16. The closure plate 17 with its flange 18 not only acts as a closure plate, but also is employed as a mounting for the brake operating mechanism. Secured to the flange 18 at the top thereof by means of the bolts 19, or in any desired manner, is a casting which comprises the brake operating cylinder 20 and the laterally extending plate 21 upon which the brake operating levers 22 are pivotally mounted.

As the operating parts at the opposite ends of the cylinder 20 are substantially duplicates, only one set of these devices will be described.

Within the cylinder 20 are the oppositely movable pistons 24, each of which carries a plunger or piston rod 25 adapted to engage the end of the depending arm 26 of the brake operating lever 22. Each piston 24 comprises a rawhide cup leather 27 within which is a dished expanding member 28 of resilient material. The flange of the member 28 is slotted, as indicated in Figures 1 and 3, so that a substantially uniform outward pressure is exerted on the flange of the cup leather throughout its circumference. Within the member 28 is the cup-shaped member 29 adapted to be engaged by the head of the cap screw 30 which is screw threaded into the inner end of the piston rod or plunger 25.

The plate 21 is provided at each of its opposite ends with a pair of substantially semi-circular spaced bearings 31 within which are positioned the bearing portions 32 of the brake operating lever 22. Between the bearing portions 32 is an enlarged portion 33 which prevents lateral displacement of the lever in the bearing. Integral with the hub or enlarged portion 33 of each of the operating levers 22 is a depending portion 34 (Fig. 4) provided with an opening 35 through which passes one end of the link 36. In screw threaded engagement with one end of the link 36 is a sleeve or collar 39 provided with a rounded portion 40 adapted to engage within the socket 41 in the lever arm 34. The outer end of the collar 39 passes through an opening 42 in the web of the U-shaped member 43, the terminal flanges 44 of which are secured to the plate 21 by means of the screws 45. Screws 45, in addition to securing the member 43 in position, also retain the metal plates 46 which overlie the bearing portions 32 and prevent their escape from the bearings 31. As the resilient plates 46 forcibly engage the portions 32, they not only act to retain the brake lever in position, but prevent it from rattling within its bearings.

Between the web of the member 43 and a flange 47 on the collar 39 is positioned a compression spring 48 which acts to normally maintain the brake band in retracted position. The collars 39 adjacent to the free ends thereof are provided with a series of openings 49 through which pins may be passed to rotate the collar and thus adjust the slack in the brake band.

Secured to the lower side of the cylinder block, by means of the hollow cap screw 50, is a fitting 51 adapted to receive the fitting at the end of the hose 52. The fitting 51 is provided with an internal annular groove 53 which overlies an opening 54 which communicates with the internal bore of the cap screw 50. The cap screw 50 is provided at the inner end thereof with a reduced portion 55 which is positioned between the edges of the cup-shaped members 29 on the pistons and acts as a stop to limit their inward movement.

The cylinder 20 is provided at the upper side thereof with a bleeder opening 56 which is normally closed by means of the cap screw 57. The cylinder 20 adjacent to its outer ends is shouldered, as indicated at 58. Within the shouldered portion about the piston rod is a pair of metal washers 59, between which is positioned a felt washer 60, the three washers being secured in position by means of the expansive C ring 61. These washers not only provide a guiding means for the piston rod, but also limit the outward movement of the piston. The felt washer acts to prevent dust passing into the cylinder.

The closure plate 17 serves not only as a mounting for the brake operating cylinder and associated parts, but also for the brake band retaining and guiding means. It should be here noted that the drawings show the brake as applied to the left front wheel of an automobile. The arrow 90, Fig. 1, designates the direction of rotation of the wheel when the automobile is moving forward.

Secured to the flange 18 of the closure plate, by means of rivets 65, is an L-shaped plate 66 provided with an opening through which extends the lug 67 rigidly secured to the brake band 37. Positioned about the lug 67 and between the plate 66 and a pin 68 passing through the end of lug 67 is a compression spring 69. This arrangement does not differ greatly from other devices of the prior art having a similar function and, therefore, will not be described in greater detail. It should be noted, however, that this brake band stop is positioned forward of the central lower portion of the plate 18. The reason for thus positioning this mechanism will be presently explained.

Secured to the plate 18 by means of the rivets 73 is a leaf spring 74, the free end of which engages under the point of the hook 75 rigidly secured to the brake band 37, in any desired manner. Thus the spring 74 tends to move the brake band 37 away from the flange 16 of the brake drum. Pivotally secured to the outer end of the plate 72, by means of the bolt 76, is a bell crank lever 77, the laterally extending end 78 of which is adapted to engage the outer surface of the hook 75 and limit the retraction of the brake band. The arm 79 of the lever 77 is provided with a screw threaded opening through which passes the screw 80, the inner end of which is adapted to engage a portion of the plate 72 and thus permit adjustment of the arm 78 to and from the brake drum.

When the automobile carrying the wheel indicated in the drawings is moving forward, the brake drum will be rotating in a clockwise direction, as seen in Figure 1. If now fluid under pressure be admitted to the cylinder 20 through the fitting 51 and hollow cap screw 50, the pistons 24 will move from each other, and the lower ends of the levers 26 will also move from each other. As the depending levers 34 are rigidly secured to or integral with the levers 26, they also will be moved in opposite directions away from each other. Thus the adjacent ends of the brake band will be moved toward each other (see Fig. 4).

As the levers 34 are much shorter than the levers 26, the thrust of the pistons will be multiplied three or four times. The cylinder employed in the present invention has a cross sectional area of substantially one square inch. Therefore, if an operating pressure of five or six hundred pounds be employed, each of the links 36 will be acted upon by a force three or four times this amount. Thus the brake band ends will be forced towards each other by a force of 1500 to 2000 pounds acting on each end of the band. This pressure has been found to be sufficient to cause the band to enter into firm braking engagement with the brake drum.

Due to the fact that the stop lug 67 is positioned off center, the amount of band which will pull on this lug when the brakes are applied, while the automobile is traveling in a forward direction, will be much greater than the portion of the band which will be adapted to push on it. Thus by positioning the stop lug 67 off center, a more effective braking action is secured when stopping a forwardly moving automobile than is secured when stopping an automobile which is moving in a reverse direction. This is particularly desirable as a vehicle seldom moves in a backward direction at a high rate of speed.

Due to the arrangement of parts shown in the present disclosure, the same brake operating mechanism may be applied to any one of the four wheels of an automobile with absolutely no change. Likewise, the brake operating mechanism herein shown may be applied to nearly all of the existing automobiles wherein the brake drum closure plate lies substantially in the plane of the free edge of the brake drum.

In devices of the character herein shown, it is necessary that there shall be no leakage in the system as the proper operation requires that the amount of fluid in the system shall remain constant. The piston arrangement herein disclosed, which comprises a rawhide cup leather which is maintained in firm operative engagement with the cylinder wall by means of a flexible inner member, has been found to give highly satisfactory results. The rawhide cup leather has been found to be practically impervious to the fluid used in the braking system. The inner dished expanding member acts to maintain the cup leather in firm engagement with the cylinder wall. By the use of this structure, the passage of fluid through or past the cup leather is absolutely prevented.

While in the above description but a single set of details has been disclosed, it is to be understood that many variations and modifications are contemplated and the invention, therefore, is to be limited merely by the scope of the appended claims.

Having thus described my invention, what I claim is new and desire to secure by Letters Patent of the United States is:

1. In a fluid operated brake system, a pivoted axle, a wheel thereon, a brake drum carried by said wheel, a brake member adjacent to said drum, a cylinder supported by said axle at the side of said drum, a piston in said cylinder, a mounting plate overlying the periphery of said drum, and a lever pivotally supported on said mounting plate, one arm of said lever being operatively joined to said brake member, the other arm of said lever being arranged for engagement by said piston.

2. In a fluid operated brake system, a pivoted axle, a wheel thereon, a brake drum carried by said wheel, a brake band surrounding said drum, a cylinder supported by said axle, a pair of oppositely movable pistons in said cylinder, a mounting plate supported by said axle adjacent to the periphery of said drum, and a pair of levers pivotally supported on said mounting plate, each of said levers having one of its arms joined to one end of said band, its other arm being arranged to be actuated by the movement of the corresponding one of said pistons.

3. In a fluid operated brake system, a pivoted axle, a wheel thereon, a brake drum carried by said wheel, a brake band about said drum, a cylinder supported by said axle, a pair of pistons in said cylinder, a mounting plate supported by said axle and positioned above said brake drum, and a pair of levers pivotally supported on said mounting plate, said levers each having one end operatively engaged with the corresponding end of said band, and the other end being arranged to be actuated by one of said pistons.

4. In a fluid operated brake system, a pivoted axle, a wheel thereon, a brake drum carried by said wheel, a brake band about said drum, a cylinder supported by said axle at the side of said drum, a pair of pistons in said cylinder, a mounting plate supported by said axle and overlying the periphery of said drum, and a pair of levers pivotally supported on said mounting plate, each of said levers including a pair of downwardly extending substantially parallel arms, one of the arms of each lever being operatively connected to the corresponding end of said brake band, the other arm of each of said levers being arranged to be actuated by one of said pistons.

5. In a fluid operated brake system, a pivoted axle, a wheel thereon, a brake drum carried by said wheel, a brake band about said drum, a closure plate for said drum carried by said axle, a cylinder mounted on said closure plate, a pair of oppositely movable pistons in said cylinder, a mounting plate carried by said closure plate and overlying the periphery of said drum, a pair of levers pivotally supported on said plate, each of said levers including a pair of downwardly extending substantially parallel arms, and links joining the ends of said brake band to corresponding arms of said lever respectively, said pistons being arranged to move the other arms of said lever from each other to tighten said band about said drum.

6. In a fluid operated brake system, an axle, a wheel thereon, a brake drum carried by said wheel, a brake band about said drum, a cylinder supported at the side of said drum, a pair of pistons in said cylinder, a mounting plate supported above said brake drum, and a pair of levers pivotally supported on said mounting plate, said levers each having one end operatively engaged with the corresponding end of said band, and the other end being arranged to be actuated by one of said pistons.

7. In a fluid operated brake system, an axle, a wheel thereon, a brake drum carried by said wheel, a brake band about said drum, a cylinder supported at the side of said drum, a pair of pistons in said cylinder, a mounting plate overlying the periphery of said drum, and a pair of levers pivotally supported on said mounting plate, each of said levers including a pair of downwardly extending substantially parallel arms, one of the arms of each lever being operatively connected to the corresponding end of said brake band, the other arm of each of said levers being arranged to be actuated by one of said pistons.

8. In a fluid operated brake system, an axle, a wheel thereon, a brake drum carried by said wheel, a brake band about said drum, a closure plate for said drum, a cylinder mounted on said closure plate, a pair of operatively movable pistons in said cylinder, a mounting plate carried by said closure plate and overlying the periphery of said drum, a pair of levers pivotally supported on said plate, each of said levers including a pair of downwardly extending substantially parallel arms, and links joining the ends of said brake band to corresponding arms of said levers respectively, said pistons being arranged to move the other arms of said levers from each other to tighten said band about said drum.

9. In a braking system for a vehicle, a wheel, a brake drum thereon, a brake band about said drum, fluid actuated means for bringing said band into operative engagement with said drum, and a stop for preventing movement of said band with said drum, said stop being so positioned that the distance therefrom to said actuating means is greater in the direction of rotation of the wheel when said vehicle is moving forward than when moving backward.

10. In a braking system for a vehicle, a wheel, a brake drum thereon, a brake band about said drum, a closure plate for said drum, fluid actuated means carried by said plate for bringing said band into operative engagement with said drum, and a stop on said plate for preventing movement of said band with said drum, said stop being so positioned that the distance therefrom to said actuating means is greater in the direction of rotation of the wheel when said vehicle is moving forward than when moving backward.

In witness whereof, I hereunto subscribe my name this 24th day of May, 1923.

MALCOLM LOUGHEAD.